Oct. 14, 1941.  T. H. MORGAN  2,258,789
METHOD OF AND APPARATUS FOR SEPARATION OF MATERIALS
Filed Jan. 13, 1938  8 Sheets-Sheet 4
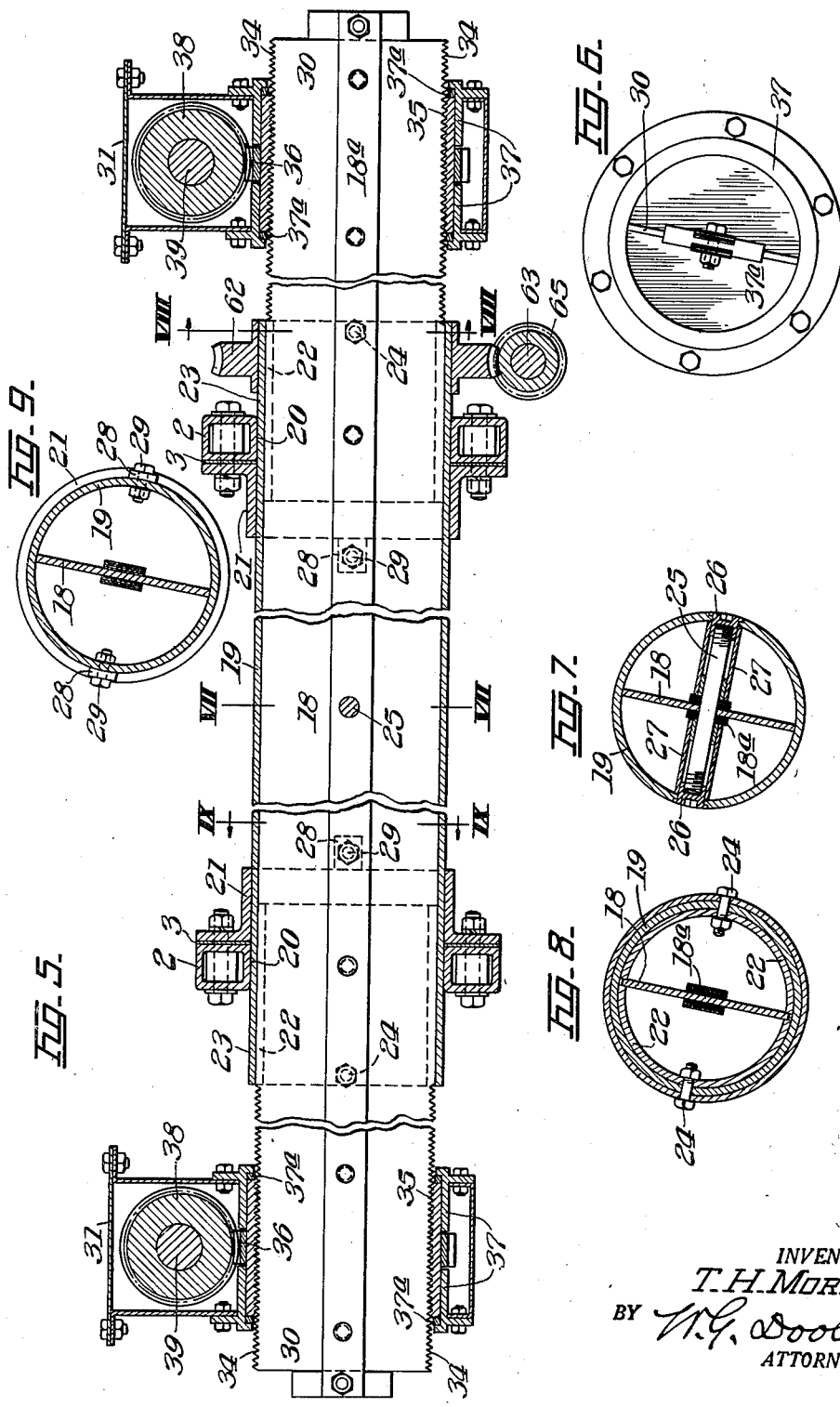
INVENTOR.
T. H. MORGAN
BY W. G. Doolittle
ATTORNEY Oct. 14, 1941.  T. H. MORGAN  2,258,789
METHOD OF AND APPARATUS FOR SEPARATION OF MATERIALS
Filed Jan. 13, 1938  8 Sheets-Sheet 5
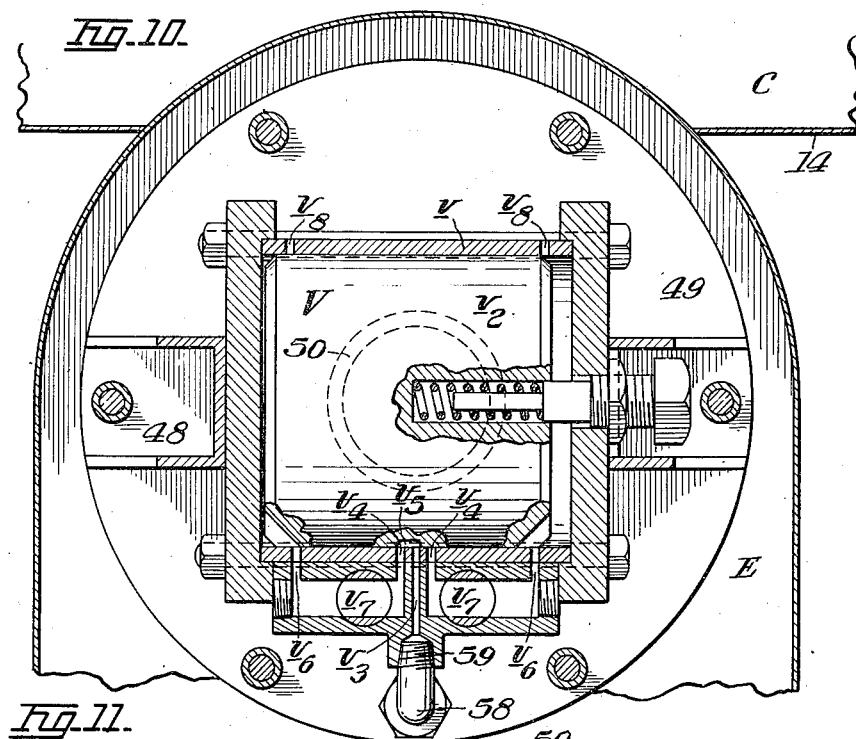
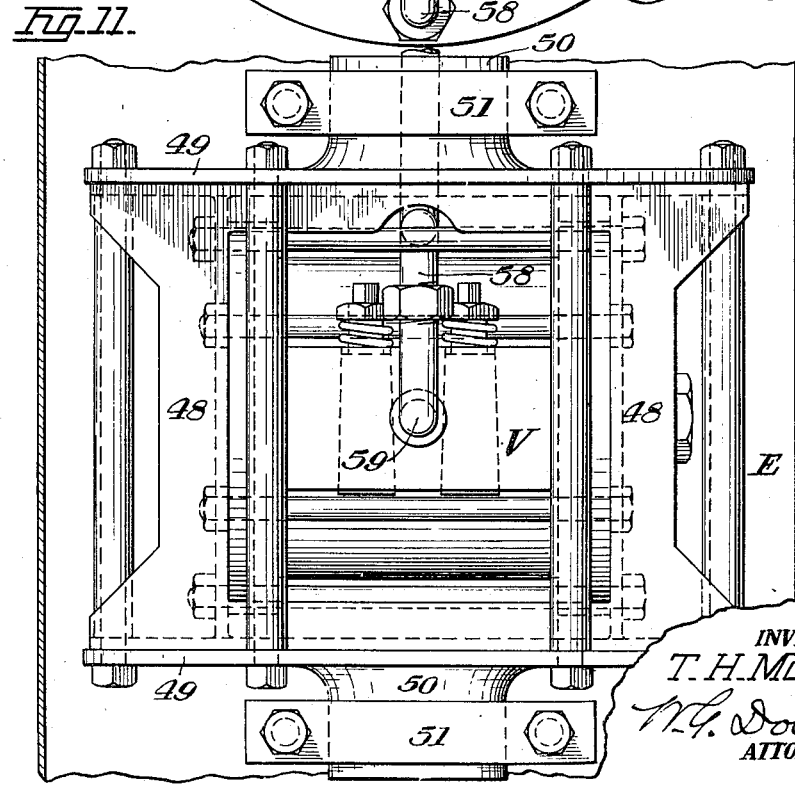
INVENTOR.
T. H. MORGAN
ATTORNEY.

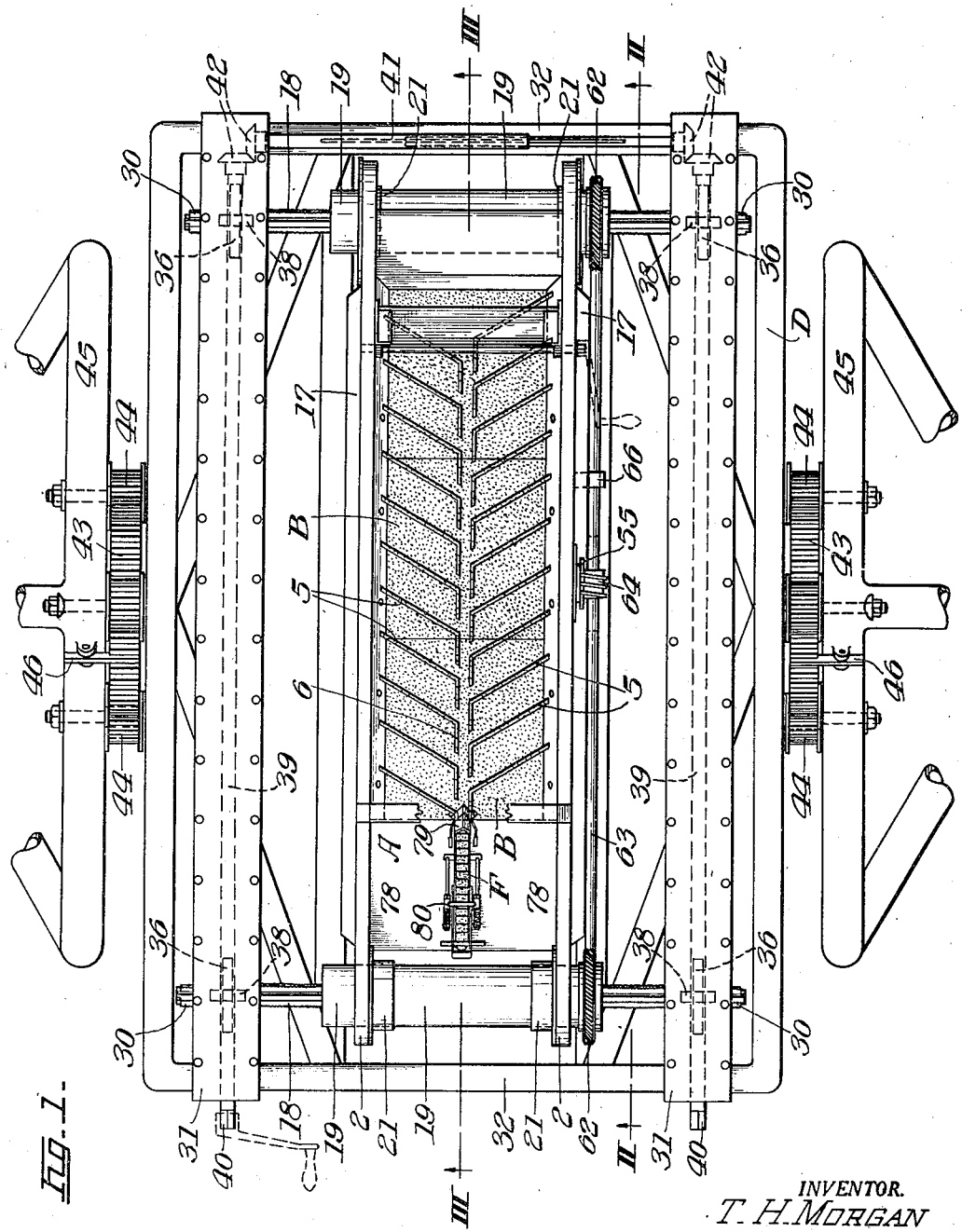

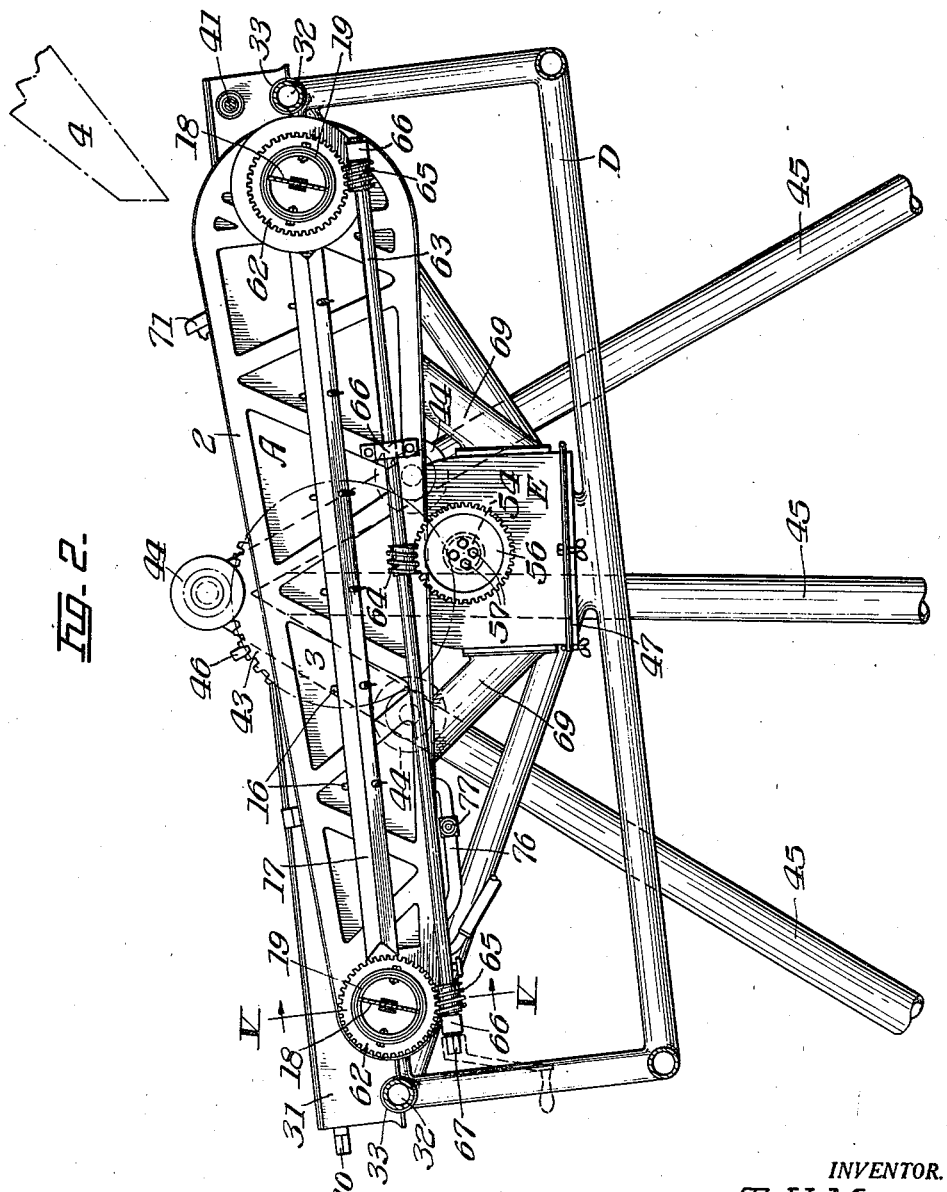

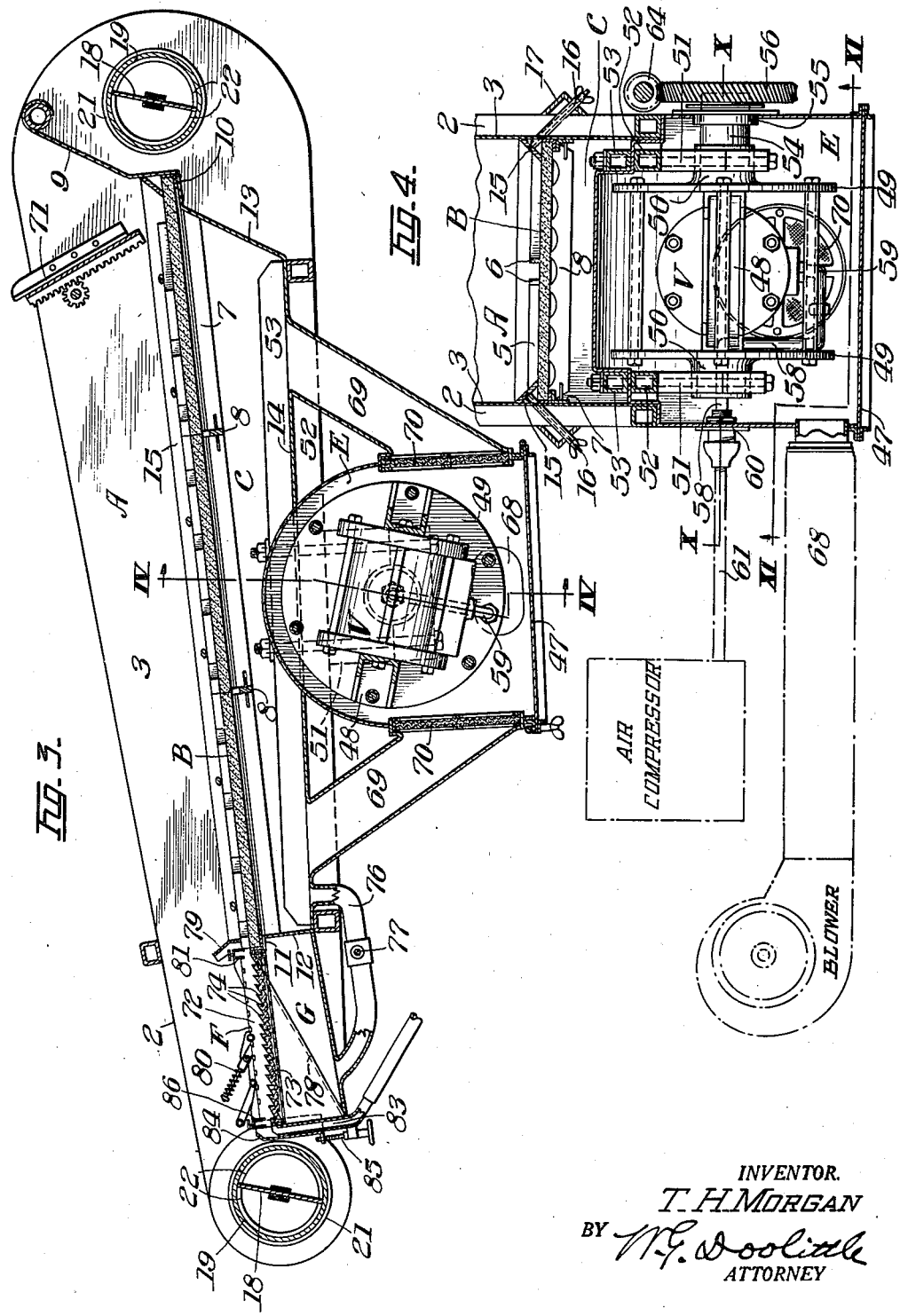

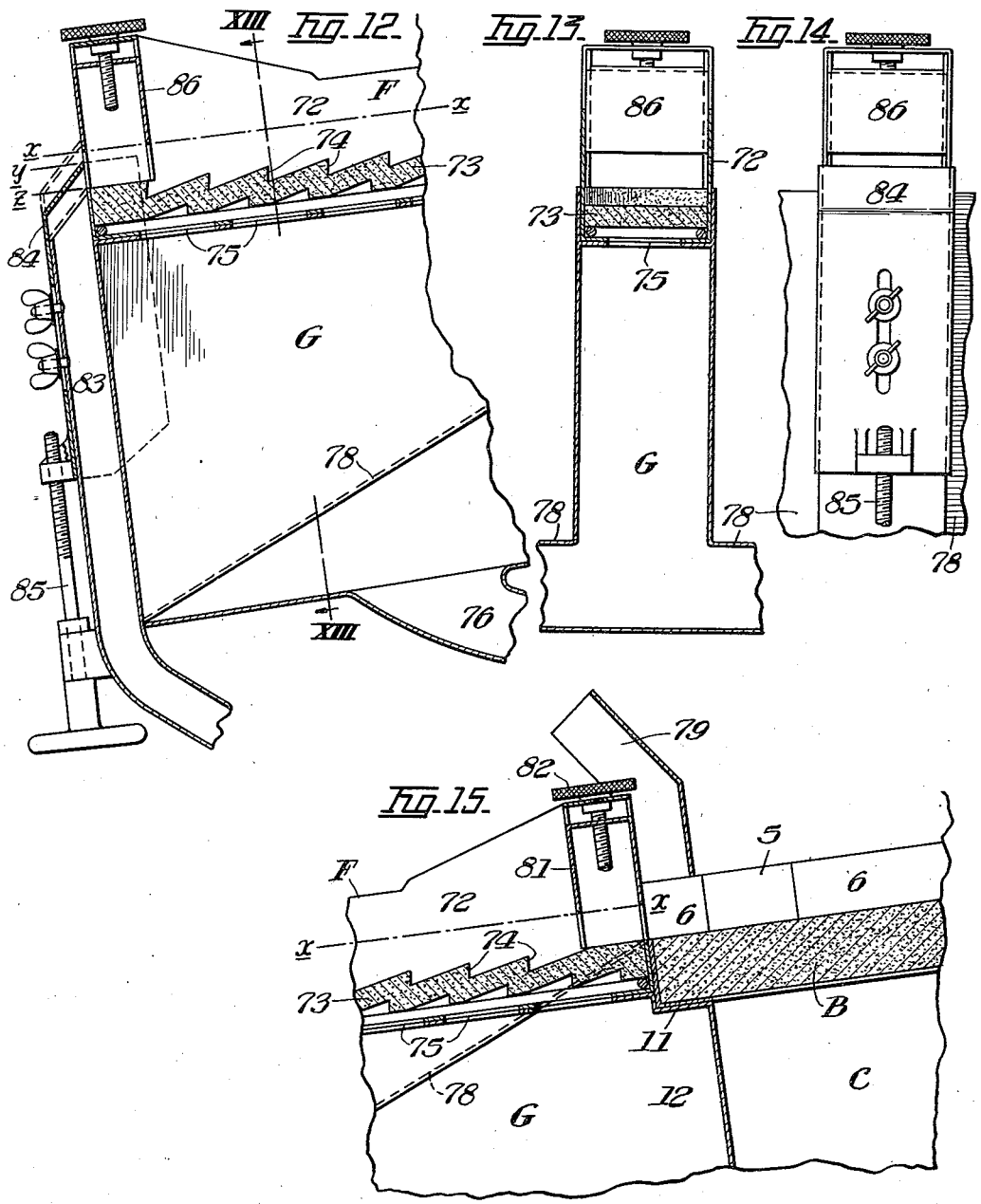

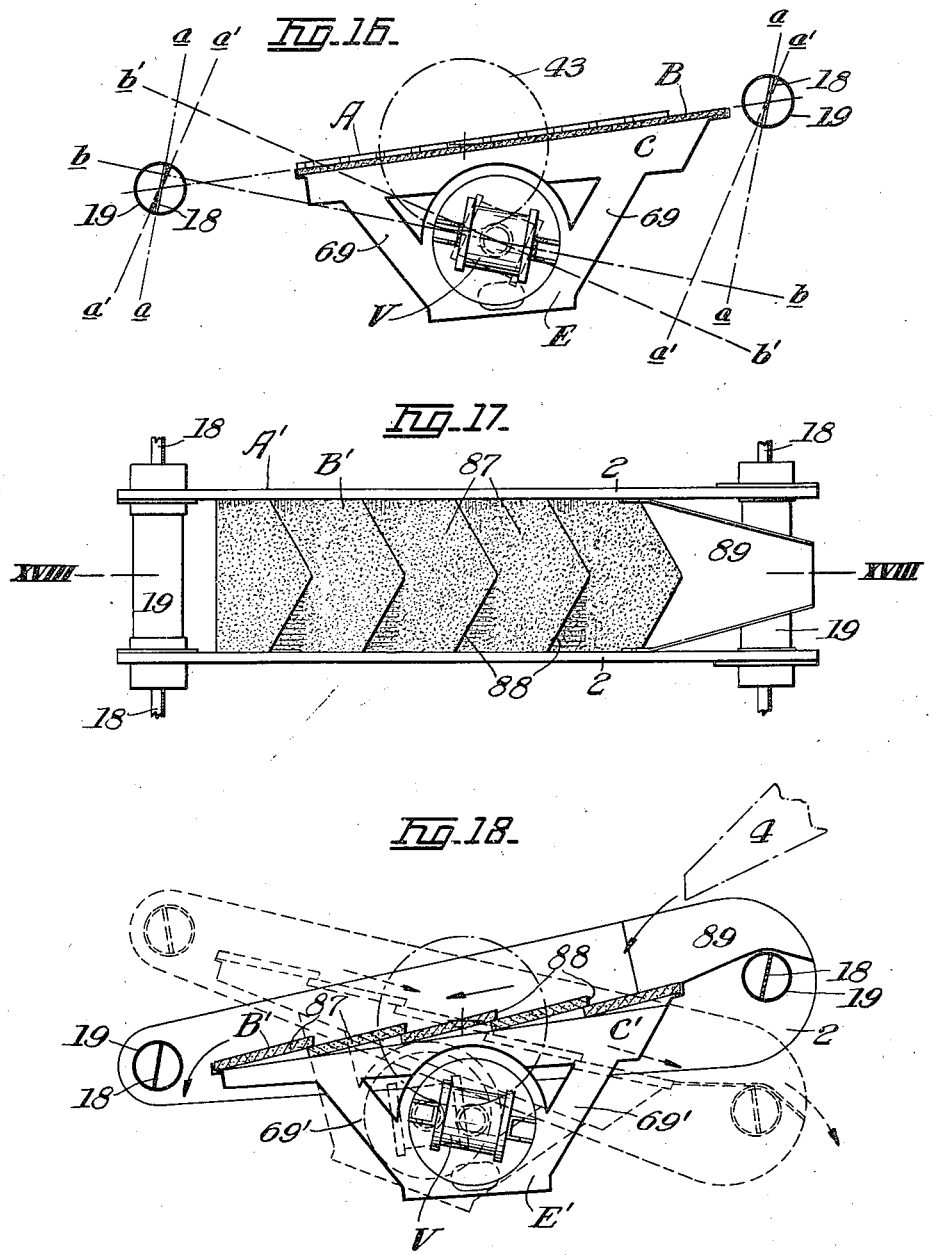

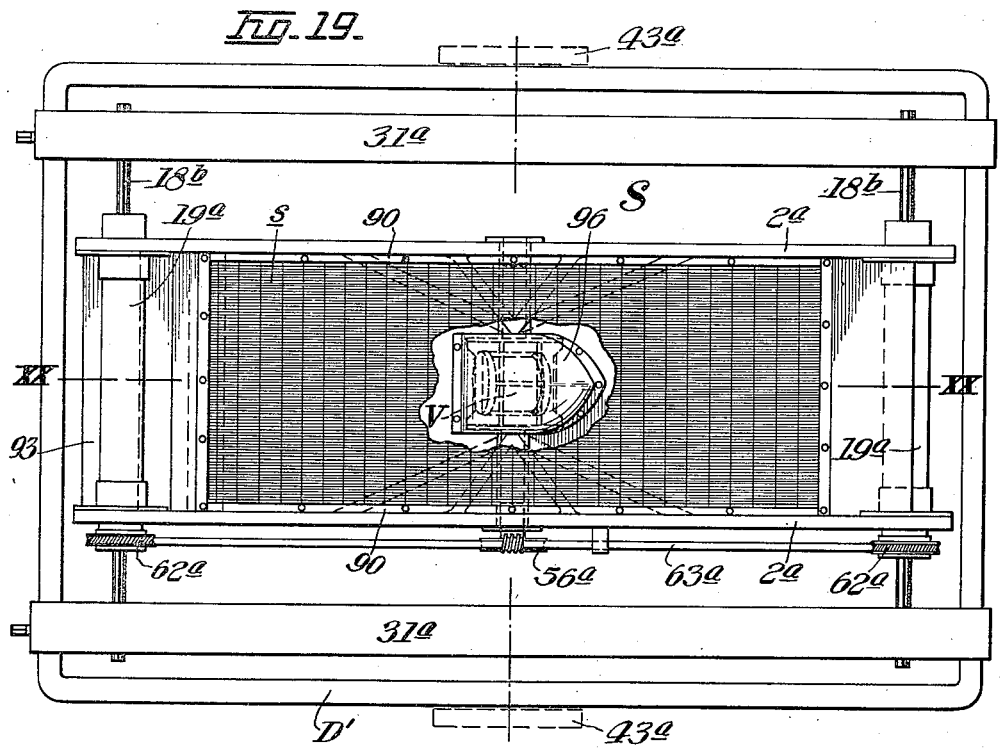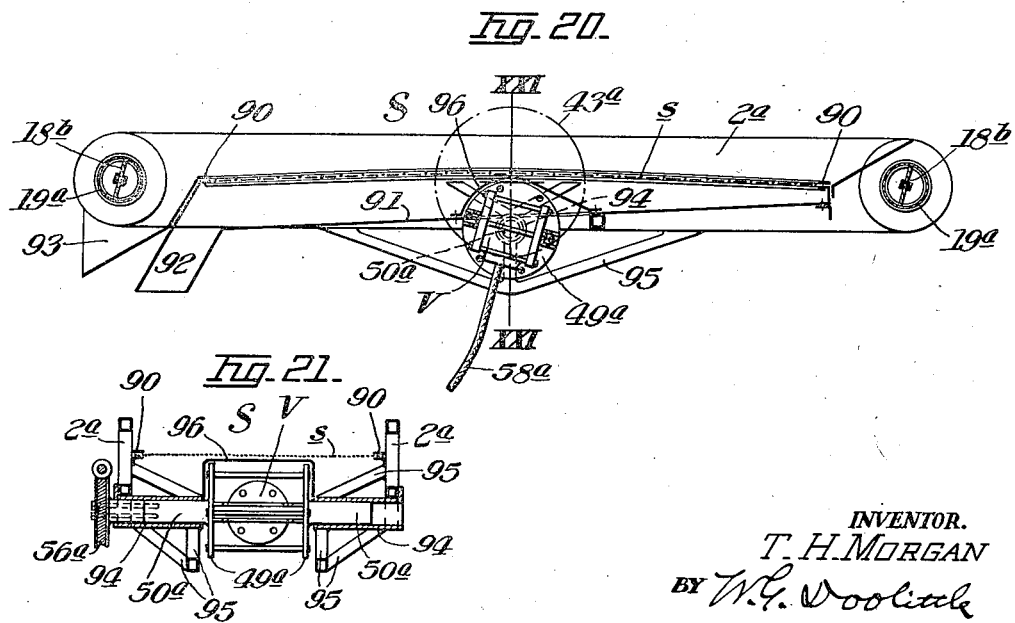

Patented Oct. 14, 1941

2,258,789

UNITED STATES PATENT OFFICE 2,258,789

METHOD OF AND APPARATUS FOR SEPARATION OF MATERIALS

Thomas Hubbard Morgan, Kittanning, Pa., assignor to S. S. Bruce, and H. C. Oliver, Pittsburgh, and T. Hubbard Morgan, Kittanning, Pa., trustees Application January 13, 1938, Serial No. 184,805

16 Claims. (Cl. 209—467)

This invention relates to a new and improved method of and apparatus for separating, classifying and/or concentrating masses of various kinds of materials containing constituents of different sizes or different specific gravities or both, as for example, separating various constituents of ore, sand and the like, as well as other masses of materials.

Apparatus and methods heretofore employed both in fluid flotation separation and in screen-sizing or screen separation of materials have been deficient in that they have omitted a number of desirable features; thus, flexibility or adaptability to enable efficient operation under the varying conditions encountered in practice. A grave disadvantage or deficiency has been due to the manner of mounting the table, screen or material-receiving element and the associated vibrator employed in the assembled apparatus.

Heretofore, mountings for the table or screen have been without particular relation to the applied vibration of the said device, and are inherently independent and uncontrollable, preventing properly unified and controlled agitation. Likewise, in prior separators, the vibration or agitation has been applied to the table or screen in substantially a fixed direction, preventing any control or variation of the directional thrust thereof in relation to the table or screen and to the flow or mass of the material being treated.

The present invention provides new and improved means and a new method, whereby the desirable features heretofore omitted in apparatus and methods of the prior art and of the character of my invention are incorporated. A characteristic and important feature of my invention resides in the means and manner of mounting the table or screen employed, and to this end the present invention contemplates a new and improved resilient mounting.

Further objects are; to provide an assemblage having a vibrator associated with the separator in such a manner as to directly vibrate the screen or table at high frequencies and with increased efficiency, the vibrator being of a character to effect high frequency vibrations and preferably directly applied to and supported by the screen or table; to provide a new and improved screen or table mounting preferably including a pair of spaced apart elongated spring members each having a freely flexing portion on which the material-receiving element is mounted, said mounting means having a definite relation to the thrust or action of the vibrator, whereby the vibration of the material-receiving element and the effective directional thrust of the vibrator may be synchronized or balanced for constant and maximum vibratory action; and to provide an association of spring mounting and vibrator in which the direction of vibration of the table or screen may be varied for selective control in the treatment of materials thereon.

The invention also has in view to provide for an adjustable control of the relation of the table or screen mounting and vibrator during the operation of the device, whereby the operator may readily and properly control the same while observing the operation. By means of the vibration and the adjustable features set forth, I am enabled to operate my separator at maximum efficiency and with accuracy of control, to produce a highly satisfactory concentration and separation in complex and otherwise difficult materials.

After considerable experimentation and work I have ascertained that the incorporation and employment of a pneumatically operable vibrator, in apparatus of the character of my invention, is very important. Further, that when a vibrator of this type is employed with the spring suspension of the receiving element, I am enabled to provide a separator apparatus having a greatly increased capacity; a construction relatively light in weight, and one which is simple, easy to operate, and of low initial and operating costs.

The present invention is particularly applicable to a method and apparatus for fluid flotation separation of materials of the character stated, wherein the operation includes blowing air through the material while agitating the mass, thereby stratifying and concentrating the material in accordance with the specific gravities of its ingredients, and removing the heavies or concentrates, either as the desired residue, or to be discarded as waste, as the case may be.

In conjunction with such fluid flotation separation, my invention contemplates the employment of the pneumatically operable vibrator and utilizing the exhaust fluid from the vibrator to create pulsation in the fluid flow through the table or bed. This method produces more effective agitation and an increased rate of settlement or concentration of the material being treated.

A still further advantage of pneumatic vibration here resides in the fact that the same power source and medium, that is to say, compressed air, may be used for aeration of the table and the vibration thereof, thereby dispensing with a large amount of equipment, as when attempting to utilize electric vibration. In the latter connection also, the present invention is extremely portable, which is of prime importance in the field, whereas the size and weight of an electric vibrator with its power generating equipment is too cumbersome.

My invention also has particular application to a screen for sizing separation of materials. By providing a screen having the spring mounting and vibrator in the relation herein set forth, I am enabled to properly vibrate the screen for maximum rate of screening with minimum wear on the screen cloth.

Additional objects and advantages will become apparent from the following description, taken in connection with the accompanying drawings, wherein:

Fig. 1 is a plan view of a separator device embodying my invention particularly adapted for fluid flotation separation of materials;

Fig. 2, a longitudinal section thereof taken on the line II—II of Fig. 1;

Fig. 3, an enlarged longitudinal section taken on the line III—III of Fig. 1;

Fig. 4, a transverse section taken on the line IV—IV of Fig. 3;

Fig. 5, an enlarged transverse section taken on the line V—V of Fig. 2, showing one of the table-supporting springs and the mounting thereof;

Fig. 6, an end view of the spring mounting of Fig. 5;

Figs. 7, 8 and 9, detail cross-sections of the spring and its mounting, being taken on the lines VII—VII, VIII—VIII and IX—IX of Fig. 5, respectively;

Fig. 10, an enlarged sectional view taken on the line X—X of Fig. 4, particularly illustrating the pneumatic vibrator;

Fig. 11, an elevational view of the vibrator and its mounting, the said view being indicated by the line XI—XI of Fig. 4;

Fig. 12, an enlarged longitudinal sectional view of the tail or discharge end of the collector unit, particularly showing the adjustable control gates;

Fig. 13, a transverse sectional view taken on the line XIII—XIII of Fig. 12;

Fig. 14, a fragmentary end elevational view of the discharge end of the collector unit;

Fig. 15, an enlarged longitudinal sectional view of the head or entrance end of the collector unit, particularly showing the adjustable control gate;

Fig. 16, a view similar to Fig. 3 in somewhat diagrammatic form, particularly illustrating the relation of adjustment of the vibrator and springs;

Fig. 17, a plan view of a modified form of fluid flotation separator table;

Fig. 18, a somewhat diagrammatic section taken on the line XVIII—XVIII of Fig. 17, illustrating a manner of cleaning the table to remove the concentrates;

Fig. 19, a plan view illustrating the embodiment of my invention in a screen for sizing separation of materials;

Fig. 20, a longitudinal sectional view thereof taken on the line XX—XX of Fig. 19; and Fig. 21, a transverse sectional view taken on the line XXI—XXI of Fig. 20.

Referring to the drawings, my invention will first be described in connection with the method of and apparatus for fluid flotation separation of materials. The terms "separator" and "separation" are used herein to designate respectively the apparatus for and process of classifying the materials treated, whether by specific gravity by means of a fluid flotation separator bed or table, or by sizing as on a separator screen.

Thus, A designates generally, a separator or concentrator table including a pair of side frame members 2 preferably in the form of truss members comprising a plurality of hollow members welded together for lightness and strength, a preferred configuration of one of said members being clearly illustrated in Fig. 2. The inner faces of the side frames 2 are covered by plates or sheets 3 welded thereto, the upper portions thereof forming with an intervening longitudinally extending material-receiving element or bed B, a trough into which the material to be treated may be delivered, as by a chute 4, from any suitable source of supply.

The bed B is located substantially midway between the upper and lower edges of the side members 2, and is preferably made of permeable or porous material, such as stone or composition, having sufficient porosity to render the same permeable to air. This bed is preferably formed of several sections cemented together for strength, and has on the upper or material-receiving surface thereof, a plurality of spaced riffles 5 in the form of upwardly projecting abutments or ribs. These ribs are arranged in two longitudinally staggered series extending inwardly from either side of the bed at an angle to the direction of flow over the bed, and have terminal portions 6 in longitudinal spaced alinement down the center of the bed for guiding the concentrates as hereinafter set forth.

As shown in Figs. 3 and 4, the bed is supported longitudinally by means of angles 7 welded along the walls 3 of the side members 2, and transversely at the joints between the sections of the bed by supports 8, the upper edges of the latter being cut away as shown to prevent interference with the passage of air through the bed.

The upper or head end of bed B is stepped into and transversely supported by a head wall 9 of the table, as at 10, and the tail end thereof is stepped into and supported at 11 by a transverse end wall 12 of an elongated air chamber C, the latter being disposed beneath the table. Chamber C extends between the lower portions of the side walls 3 of the table beneath the bed, and is closed at the head end by a lower continuation of the wall 9, as at 13. A bottom wall 14 closes the chamber C, all of said walls and side members being welded together for sealing the chamber.

15 designates holding bars or clamps extending longitudinally of and above the junctures of the side walls 3 with the bed B. Angularly disposed tie bolts 16 extend from the clamps 15 outwardly through the walls 3, and through longitudinal angle bars 17 disposed centrally along the outer faces of the side members 2, whereby to exert a downward holding tension on the bed against its supports 7 and 8, as will be clearly seen in Fig. 4.

The table A and its bed B are supported on and by transverse flat springs 18 located at the head and tail ends thereof, said springs being mounted in tubular bearing members 19 disposed between and rotatable in the side members 2 of the table. The preferred manner of mounting the tubular members 19 in the table and in connection with their springs is substantially the same at the head and tail ends of the table, and hence one such mounting only is illustrated in detail, as in Figs. 5 to 9 inclusive.

The sleeves or tubular bearing members 19 extend transversely of the table through and are rotatable in provided openings 20 in the side frame members 2, the latter being also provided with inwardly projecting bearing collars or annular flanges 21 for supporting the tubular members, the said collars 21 being secured to the side members 2 as by means of bolts.

Springs 18 are preferably equal in width to the inner diameter of the tubular members 19, and are maintained diametrically of said members by semicircular retainers 22 on either side of the springs, the retainers being positioned within and bolted to the outer projecting ends 23 of the tubular members 19 as at 24, in Figs. 5 and 8. In this manner, the springs 18 are rotatable about their longitudinal centers by a rotation of the members or sleeves 19.

The springs 18 are secured to and further supported in their tubular members as in Fig. 7, by means of central studs 25, said studs passing through the spring centers diametrically of the tubular members 19, and having the threaded ends thereof secured to the tubular members as by nuts 26. Spacers 27 surround said studs and are positioned by the units to center the springs diametrically within the tubular members. 18a designates central longitudinal reinforcing laminations riveted on both sides of the springs for added strength without impairing the flexibility of said springs.

The tubular members 19 are held in place in the side frame members 2 by means of external lugs 28 bolted to said members as at 29 in Figs. 5 and 9, the lugs engaging the inner ends of bearing collars 21.

The terminal ends 30 of the springs 18 project laterally of the table and are supported in a pair of parallel outriggers or beams 31, one such outrigger extending longitudinally of and on each side of the table A. At their ends, the outriggers 31 are supported on the transverse members 32 of a pivoted cradle, generally designated D, the outriggers being slidably mounted on said members 32 as by bearings 33.

A preferred engagement or mounting of the springs in said outriggers is illustrated in detail in Fig. 5, including the provision for relative movement of the outriggers and springs. Thus, the terminal projecting portions 30 of the springs 18 are threaded along their longitudinal edges, as at 34, for engagement with internally threaded sleeve nuts 35.

Nuts 35 are mounted for rotation within the out-riggers 31, the latter being preferably of hollow box-like construction. Each nut 35 is provided with a spiral gear 36 centrally secured to and rotatable with said nut. Annular retainers 37 are bolted to the sides of the outriggers and extend inwardly through provided openings in the outrigger sides, providing annular casings within which the nuts 36 may rotate. Rotatable end plates 37a are mounted between the retainers 37 and each end of the nuts 35, said plates being diametrically slotted for supporting the spring ends 30.

Each gear 36 extends between the said retainers and outwardly therebeyond for engagement with a spiral gear 38. The gears 38 on each side of the table A are rotatable by and with shafts 39 extending longitudinally of and suitably supported within the outriggers 31, which shafts 39 project from the outriggers at one end of the table A, as at 40 in Figs. 1 and 2, for rotation of the shafts as by means of a crank, thereby rotating the nuts 35 on the threads 34 of the springs 18 to translate the outriggers on said springs and the supporting members 32 of the cradle D.

In order that the said outriggers 31 may be both moved inwardly or outwardly simultaneously in parallelism, I prefer to connect the shafts 39 through a transverse telescoping shaft 41, as by means of miter gears 42. Hence, with the miter gears arranged as shown in Fig. 1, by employing all spiral gears 36 and 38 having right hand teeth, rotation of either shaft 39 will move the outriggers toward or away from each other simultaneously for purposes hereinafter more fully set forth.

The cradle D is preferably of skeleton form, comprising a plurality of tubular members forming a rectangular frame and welded into a well braced or trussed formation for combined lightness and strength, and is pivotally supported for rotation through 360-degrees about a central transverse axis for correspondingly supporting and rotating the table A carried thereby. For example, gears 43 may be bolted to the longitudinal portions of the cradle on said pivotal axis, the gears being received between and supported by a plurality of flanged gears 44 rotatably mounted on tubular supporting side frames 45. Said frames 45 may be mounted on any suitable base or enter into the construction of a supporting framing or mounting on a truck or the like depending upon the location and installation of the machine. Gear pawls 46 or the like may be employed for securing the gears 44, whereby the table A and cradle D may be held in a desired position.

Means are provided for vibrating or agitating the table A and its bed B on and in relation to the springs 18, said means comprising a vibrator generally designated V. While this vibrator may be of various types, I prefer to employ a pneumatic vibrator of the character set forth in my Patent 2,119,285 of May 31, 1938. I have found that the pneumatic type of vibrator has particular advantages, as will hereinafter more fully appear.

Generally as shown in Fig. 10, this type of vibrator comprises a cylinder $v$ having a reciprocating piston or weight $v_2$ therein, which latter is motivated by air under pressure through the action of registering ports as follows. Air is supplied by a line or conduit 58 connecting the vibrator as at 59, and enters the cylinder through a central port $v_3$. Spaced on either side of the central port are cylinder ports $v_4$ alternately communicating with the central port through a connecting port $v_5$ in the periphery of the piston.

Each port $v_4$ communicates with an end of the cylinder V through a port $v_6$ and an intervening valve-controlled chamber $v_7$. $v_8$ designates exhaust ports adjacent the cylinder ends through which the air exhausts to a manifold or chamber E in which said vibrator is mounted, whereby the exhaust air is discharged into the air fed to the bed B in the manner and for the purposes hereinafter more fully described.

Such a vibrator is compact, light in weight, and readily applicable to its intended purpose here. It provides a low amplitude high frequency stroke which has decided advantages in the concentration and separation of materials of close specific gravity difference. When subjected to vibrations of this character, the material will remain close to the bed surface, and does not become broken up.

The vibrator V is preferably applied to the table

A in as close proximity to the center of gravity of said table as may be permitted by the general construction and configuration of the device. Accordingly, the vibrator is mounted centrally of and slightly below the table, whereby the vibration may be uniformly distributed over said table.

As stated, the vibrator is mounted within the fluid chamber or manifold E depending beneath the table A and the air chamber C thereof, the manifold E being in the form of a sealed box having a bottom opening closed by a sealing cover 47. The vibrator V is positioned in said manifold with the axis of travel of its piston in a central vertical longitudinal plane of the table, and is mounted for rotation in said plane about a central transverse axis of the vibrator. For this purpose, a channel-shaped yoke or frame 48 surrounds the vibrator and is bolted thereto, the yoke 48 mounting a pair of trunnion plates 49 whereby to aline the trunnions 50 thereof with the said transverse axis of the vibrator. 51 designates bearings for receiving the trunnions 50 to rotatably support the vibrator, said bearings depending from bottom table frame members 52 and reinforcing longitudinal stringers 53 within the air chamber C.

The trunnions 50 are preferably hollow, and one of them has secured thereto an extension 54 extending outwardly through one side of the manifold and through a stuffing box or gland 55, which extension is utilized for mounting a left-hand worm gear 56, as by bolts 57, see Fig. 2. The other trunnion 50 permits the axial passage therethrough of the air line 58 connecting the vibrator V as at 59, which line passes through a swivel gland 60 in the opposite side of the manifold E, from which gland 60, an air supply line 61 connects with a suitable source of supply of compressed air.

On the same side of the table as the worm gear 56, the tubular spring bearings 19 are each provided with a right hand worm gear 62 of the same diameter and pitch as the gear 56, the gears 62 being secured to the projecting portions 23 of members 19 by means of the bolts 24, as in Figs. 5 and 8.

The worm gears 56 and 62 are disposed in a common plane, and are operable through a common shaft 63 having a complemental left-hand worm 64 and right-hand worms 65 thereon. Shaft 63 is carried in suitable bearings 66 on the frame member 2 of table A, and one end 67 of the shaft projects for engagement by an operating crank.

The worm gearing just described is set originally so as to aline the springs 18 at the head and tail of the table A for flatwise disposition thereof in parallel planes, as for example, as indicated by the lines a—a in Fig. 16. Also, with the springs so disposed in parallel relation, the vibrator adjustment gearing 56—64 is adjusted to bring the axis b—b of the vibrator, which is the line of travel of the piston thereof, at right angles to the parallel planes a—a of the springs, whereby the directional thrust of the vibrator is in the direction of flexing of the springs. Having been once set in this manner, the flatwise disposition of the springs is maintained normally to the direction of thrust of the vibrator, and in such normal relation, are adjustable, together with the vibrator, relatively to the table A, and particularly to the material-receiving surface of the bed B through the adjustment shaft 63. This constant relation is further illustrated by the adjusted position shown by the dotted lines of Fig. 16, and by the respective lines a'—a' and b'—b'.

Air or other fluid for passage through the bed B for effecting flotation, is supplied from a suitable source of compressed air to the manifold or chamber E through a conduit 68, see Fig. 4, and from the manifold, it passes upwardly through central conduits 69 to the chamber C and through the porous bed B. Suitable renewable filters 70 are positioned in the outlets from chamber E to conduits 69 to trap any oil particles which may be entrained in the incoming air, as from a compressor at the source of supply, or from the vibrator V, for the purpose of protecting the material of the bed therefrom.

In operation, the table A is preferably slightly inclined downwardly toward the tail or left end, as illustrated in Figs. 2 and 3, by adjustment of the cradle D. A substantial flow of low pressure air is supplied to the bed B as described, and relatively high pressure air is admitted to the vibrator V, whereupon the bed is immediately subjected to the fluid passing therethrough and is also vibrated. Material is fed to the head or right end of the table from the chute 4, and the depth thereof on the table, is controlled by an adjustable transverse gate 71.

As the material passes over the bed B, the heavies are separated or concentrated in front of the riffles 5, from whence they flow to the center of the bed and are there carried toward the tail end of said bed by guiding ribs 6.

Particular attention is called to the ready adjustability and control of the apparatus when desired, whereby the most efficient operation may be maintained under any and all conditions encountered.

Thus, the operator may adjust the position of the outriggers 31 by one of the shafts 39, to vary the length of the springs 18 between said outriggers to permit of proper vibration travel of the table and its bed. Also, by adjusting the shaft 63, the direction of application of the vibration to the table and bed may be varied for best results, due to the angular change effected by such adjustment in the application of the direction of flexing of the springs 18 to said table, the directional thrust of the vibrator V being maintained in the direction of flexing of said springs, as described.

By means of these adjustments and observations of the flow of the material over the bed, the operator is enabled to readily determine and effect the most advantageous conditions for flotation and agitation of the material being treated.

It is particularly to be noted, that by reason of the vibrator being supported by the table only, the table and bed will attain the most efficient vibration possible, and by adjustment of the spring length by the outriggers 31, the most effective length of spring may be obtained, whereby the vibrator and springs may be brought into perfect synchronous vibrating movement, for the mass and character of the material being treated.

The material on the bed B is floated or agitated by the air flow upwardly therethrough and by the vibration, and by adjustment of the directional thrust of the vibrations, the material may be conveyed by the vibration at a rate of flow greater or less than the natural gravity flow thereof due to the inclination of the table and bed.

While considerable turbulence is thus produced in the flowing mass, the same is generally of a uniform character under the action of the constant flow of air and the vibration. I have found that the concentration and separation of the heavies is greatly aided by pulsating the flow of air to the bed B, and have accomplished such pulsating flow by the discharge or exhaust air from the vibrator V, whereby the rate or speed of settlement of the heavies or concentrates is increased.

In other words, the vibrator V operates at high frequencies, and at each stroke exhausts air therefrom under considerable pressure. By mounting the vibrator in the manifold E, the exhaust therefrom augments the constant volume flow of air to the bed from the supply line 68 and pulsates said air, thereby producing the desired increased turbulence and flotation in the material being treated on the bed.

The concentrates or heavies passing to the tail end of the table may be collected and removed in several ways. For example, they may be subjected to a secondary concentration treatment while in a collector unit or device F, which unit is positioned in alinement with and receives the concentrates from the central guide members 6 of the bed B.

The unit F comprises generally a narrow trough 72 having a permeable stone or composition bottom or bed 73 of the same material as the bed B, said bottom 73 having a plurality of transversely extending riffles or abutments 74 on its upper surface for final collection of the concentrates or heavies. The trough and bed 73 are mounted over a supplemental air chamber G to which air is supplied from the main air chamber C, as by a connecting conduit 76 having a control valve 77. Air from the supplemental air chamber G passes to the bed 73 through registering openings 75 in the upper wall of said chamber and the lower wall of the trough 72 (see Figs. 12, 13 and 15).

The tailings or lighter materials pass over and around the unit F, and flow downwardly on either side thereof over inclined table ends 78, the latter forming the upper wall of the supplemental air chamber G. A deflector abutment 79 is removably positioned at the entrance to said unit F for deflecting the upper stratum of the tailings laterally to the discharge table portions 78, to prevent the flow thereof to the unit.

A spring-actuated clamp 80 of suitable form is utilized to removably secure the unit F in position on the supplemental air chamber 75, said unit being removed from time to time to obtain the concentrates or heavies collected thereby. Such a secondary unit is highly advantageous for making frequent determinations, as when testing materials for the proportion of concentrates therein, and it may also be used in continuous operation, being removed at proper intervals for dumping the contents therefrom.

The secondary or collector unit F is preferably employed in conjunction with means controlling the level or depth of flow of the concentrated material from bed B thereover. While such means may be mounted on the table or its bed B, I prefer to provide the same on the collector unit, as shown in Fig. 15.

Thus, 81 designates an adjustable gate vertically movable in the head or entrance end of the trough 72, and extending transversely thereof. Said gate preferably abuts the tail-most riffled portions 6 of the bed for disposition in the path of and to control the concentrated material discharged therefrom.

Upon raising or lowering the gate 81, as by an adjusting screw 82, the level $x$—$x$ of the material passing from bed B over the collector bed 73 may be regulated for proper final concentration and separation in relation to and under the action of the air from supplemental chamber G. While the volume and pressure of the air fed to chamber G from chamber C may in a measure be controlled by the valve 77, the said air may be greater or less in pressure and volume than is desirable for the character of the material being finally separated in the unit F, in which case, the proper thickness of the bed of material passing over the bed 73 may be readily obtained by the said adjustable valve 81.

It is also of prime importance to provide for the control and regulation of the discharge from the secondary or collector unit F in order to prevent losses and to maintain an adequate speed of operation. For this purpose, the tail or discharge end of the unit F is provided with spout 83 having the upper or entrance end thereof controlled by an adjustable gate 84, said gate being slidably carried on the spout and adjustable by means of a suitable screw 85. The upper end of the valve 84 is adapted to be positioned at or above the upper surface of the bed 73, and in relation to the upper open end of the overflow spout 83, whereby all or a portion of the upper stratum of the material passing over said bed may be deflected into the spout 83 and thereby deposited separately from the great bulk of the tailings from the table B.

For example, in Fig. 12, the upper dotted line position shows the valve 84 disposed to receive the entire upper stratum of the concentrated material passing over the bed 73 to the depth indicated by the line $x$—$x$, which depth is controlled as hereinbefore described. With the valve 84 so disposed, it is possible to reclaim any heavies or concentrates which have not been collected by the riffles 74, and would otherwise be wasted, the same being separately deposited through the spout 83 for reapplication to the main table A as desired.

With certain classes of material, it may be advisable to only segregate a portion of the upper stratum of the concentrated material passing over the bed 73, or in other words, to take a percentage cut of the said material. In such case, the gate 84 may be positioned as indicated in the full line position $y$ in Fig. 12, whereby the lower portion of the material above the riffles will be deflected to the spout 83, the remaining or upper portion of the stratum passing outwardly over the valve 84 and discharged with the tailings from bed B.

Under some conditions and character of material, the valve 84 may be lowered to the dotted line position $z$ in Fig. 12, whereby the entire upper stratum of the concentrated material passing over bed 73 may be passed directly over the spout 83, and is commingled with the tailings from the bed B. The operator, having due regard for the volume, character of the material and the separation problem at hand, may readily adjust the gates 81 and 84 to provide the most efficient operation of the machine. It will readily be seen that the gate 84 will prevent the loss of desirable concentrates which for one reason or another might otherwise be carried over the surface of the bed 73 and into the tailings.

An additional gate 86, similar to the gate 81, may be employed if desired in conjunction with the gate 84, the said gate 86 being positioned in advance of the gate 84, and providing a secondary means for regulating the flow of the upper stratum above the bed 73.

Other means may be employed for final collection and removal of the concentrates, particularly in connection with the controllable vibration of my invention. Also, different forms of the bed B may be utilized with adequate efficiency.

I have illustrated such modifications, both as to the form of the table and the manner of cleaning or final collection and removal of the concentrates, in Figs. 17 and 18. Thus, for example, the bed B' may be formed of permeable material in the form of a plurality of overlapping or stepped slabs 87 having their transverse edges 88 facing in a direction opposite to the direction of flow of material over the bed to form riffles for collection of concentrates. These riffles may be of any suitable configuration, as for example, V-shaped as shown in Fig. 17.

The bed B' is supported as before over an air chamber C, in conjunction with the manifold E' containing the rotatably mounted vibrator V, the air manifold and chamber being connected by conduits 69'. The table A' is generally similar to that previously described, being mounted on springs 18 in tubular adjustable bearings 19, the outriggers, cradle and the various adjustment devices being the same as before, and therefore not necessarily shown.

In the operation of this modified form of concentrator, the initial treatment by aeration and vibration is accomplished as before, with proper adjustment of springs 18 and vibrator V for the material being treated. The concentrates or heavies are thereby collected by the riffles 88, and the tailings or lighter material is discharged over the tail end of the device, the main flow of material being indicated by the full arrows of Fig. 18.

Upon completion of the initial treatment, the table is preferably reversely tilted as shown in the dotted line position of Fig. 18, and the planes of the springs 18 and corresponding direction of thrust of the vibrator V are adjusted to provide a reversal of flow of material on the bed B', whereby the concentrates are conveyed toward the head end of the table where they are discharged to a suitable receptacle through a spout 89. The reverse flow of the concentrates is indicated by the dotted arrows in Fig. 18.

In the event the table is not inclined at too great an angle during the original concentration and separation, it is possible to clean the same and move the concentrates reversely up the inclined bed and out the spout 89, without changing the angle of the table, merely by adjustment of the planes of the springs and the corresponding direction of thrust of the vibrator.

From the foregoing, it will be seen that I have provided a concentrator and method of concentration treatment which may be readily adjusted to the varied conditions encountered in practice. The angular adjustment of the springs 18 and the vibrator V provides a controlled directional application of vibration through 360-degrees, through corresponding simultaneous adjustment of the vibrator for thrust in the direction of flexing of said springs. Likewise, the provision for selecting the proper length of the vibrating spring mounting in conjunction with the angular disposition thereof, enables a proper and synchronous movement of the table with and by the action of the vibrator.

These factors, together with the pulsating flow of air to the concentrator bed and the material carried thereby, provide a highly efficient and highly selective, practical and durable machine. Very satisfactory high percentage separations may be produced with my invention in either wet or dry materials.

As hereinbefore stated, the spring mounting and vibrator together with the controlled relation thereof, may be advantageously applied to a separator screen for sizing classification of materials. One such embodiment of my invention in a separator screen is illustrated in Figs. 19 to 21 inclusive.

As shown the separator apparatus includes a table or screen device generally designated S, and similar to the table A, having side members 2a and rotatable end tubular bearing members 19a. Parallel outriggers 31a are slidably adjustable on a cradle D' as before, for supporting a pair of flat parallel transverse springs 18b secured in the tubular members 19a whereby the table S is mounted on the freely flexible portions of the springs between the outriggers. Cradle D' is preferably pivotally supported about its central transverse axis as before described, as by the gears 43a.

A material-receiving element, screen or screen cloth s of usual form is carried by the screen table S, extending centrally of and longitudinally between the side members 2a, being supported and secured in any suitable manner, as by a surrounding clamping frame, indicated at 90. 91 designates a bottom member or pan extending between the side members 2a and beneath the screen cloth for receiving the material passing through the mesh of the screen for separate discharge through a spout 92 at the tail end of the table. 93 indicates a spout for separate discharge of the oversize material passing over the screen.

Mounted centrally of the table in close proximity to the center of gravity thereof, I provide the vibrator V carried by trunnion plates 49a having trunnions 50a alined on the central transverse axis of the vibrator. The said trunnions may be supported in the table structure in any suitable manner so long as the vibratory action of the vibrator is transmitted throughout the table.

For example, transversely alined central bearing sleeves 94 are welded to the side members 2a and are trussed or braced for rigidity as indicated by the welded struts 95. Thus, the vibrator V may be adjusted about its said transverse axis in a central longitudinal plane of the table and screen in the manner hereinbefore described. One of the trunnions 50a is secured to and rotatable with a worm gear 56a, and the bearing members 19a have worm gears 62a, said gears being rotatable by worms on a control shaft 63a as before, to adjust the relation of springs 18b and vibrator V to the table and screen and to the flow of material being treated thereon.

96 designates a shield or protective cover for the vibrator where the same projects through the pan 91. A flexible air line 58a may be utilized for supplying air to the vibrator V.

The operation of my improved separator screen is generally similar to that of the separator device hereinbefore described without the fluid flotation feature. The springs 18b are disposed with their flat flexing table-supporting portions between the outriggers 31a normal to the directional thrust of the vibrator, and in such relation are adjusted for the most efficient screening vibration for the character of the material and conditions of operation encountered. Outriggers 31a are adjustable inwardly and outwardly on the cradle D' as before for varying the length of the flexible portions of the springs 18b therebetween.

By applying the directional thrust of the vibrator V and the direction of flexing of the springs 18b generally in the direction of flow of material over the screen, the most efficient separation or screening action may be obtained for minimum wear on the screen cloth itself.

I claim:

1. In a separator device, the combination with a table including a material-receiving element, of a pneumatically operable vibrator for the table, a flexible mounting for resiliently supporting the table including a pair of spaced apart flat springs and rotatable members in which the springs are located and movable therewith, and cooperating means for both adjusting the directional thrust of the vibrator and for varying the direction of flexing of the springs in relation to said material-receiving element.

2. In a separator device, the combination with a table including a material-receiving element, of a flexible mounting for resiliently supporting the table, a low amplitude high frequency pneumatic vibrator for the table having its directional thrust in the direction of flexing of said mounting, and common means including a rotatable shaft and cooperating gearing for simultaneously adjusting said vibrator and mounting in relation to the material-receiving element while maintaining the directional relation of vibrator and mounting constant.

3. In a separator device, the combination with a table including a material-receiving element, of a flexible mounting for resiliently supporting the table, means for adjusting the flexibility of the mounting, a pneumatically operable straight thrust high frequency vibrator supported by the table having its effective directional thrust always in the direction of flexing of said mounting, and common means for simultaneously adjusting said vibrator and mounting in relation to said material-receiving element while maintaining the relation of vibrator and mounting constant.

4. In a separator device, the combination with a table, of a pair of parallel flat springs supporting the table, means beyond the table for rotatably supporting the springs, and a vibrator pneumatically operable for the table having the straight line directional thrust thereof in the direction of flexing of the springs, said vibrator carried solely by the table.

5. In a separator device, the combination with a table, of a pair of parallel flat laterally extending springs having flexible portions supporting the table, a pair of longitudinally extending outriggers for supporting and securing the springs beyond the table, said outriggers being adjustable on the springs to vary the length of the flexible portions thereof, and a pneumatically operable vibrator for the table having the directional thrust thereof in the direction of flexing of said springs.

6. In a separator device, the combination with a table, of a pair of parallel flat springs supporting the table, means beyond the table for supporting the springs, a pneumatically operable vibrator of the reciprocatory piston type for the table having the directional thrust thereof in the direction of flexing of said springs, and means for adjusting the direction of flexing of the springs while maintaining the directional thrust of the vibrator in alinement therewith.

7. In a separator device, the combination with a table including a material-receiving element, of a pair of flat springs extending transversely of the flow of material over the said element and upon the central portions of which springs the table is mounted, longitudinally extending means supporting and securing the end portions of the springs beyond the table, a vibrator secured to the table with the plane of the directional thrust thereof in the direction of flow over said material-receiving element, and common means for simultaneously adjusting the direction of flexing of the springs and the directional thrust of the vibrator.

8. In a separator device, a material-receiving element, a mounting for said element including a pair of spaced apart elongated transversely extending spring members, and spaced supporting means engaging said members to provide a freely flexing spring portion therebetween, to which free portion the material-receiving elements is connected, and a pneumatically operable vibrator for the material receiving element having the directional thrust thereof in the direction of the flexing of the spring portion.

9. In a separator device, an adjustable mounting including a pair of longitudinally extending spaced outriggers, a pair of spaced springs extending transversely between and supported by the outriggers, a table between the outriggers and supported by the springs which latter extend transversely of the table, rotatable means for adjusting the inclination of the springs in the table and outriggers, and means for adjusting the outriggers on the springs to vary the length of the latter between the outriggers.

10. In a separator device, an adjustable mounting including a pair of spaced transverse flat springs, a table extending longitudinally between the springs, a pair of rotatable tubular bearing members on the table through which the springs extend for supporting the table thereon, the springs being secured to and rotatable with said bearing members, and common positively acting means for rotating said bearing members and springs for adjustment of the latter in relation to the table and a pair of longitudinally extending outriggers for supporting and securing the springs beyond the table.

11. In a separator device, a permeable table, means for feeding fluid under pressure to the table including a fluid chamber, and a pneumatically operable vibrator for vibrating the table disposed in and exhausting into the chamber for pulsating the fluid feed to the table.

12. In a separator device including a resiliently mounted table, said table having a riffled permeable bed, a fluid chamber beneath the bed for feeding fluid to the under side thereof, a fluid manifold communicating with the chamber, a fluid outlet in the manifold for supplying fluid to the chamber, a pneumatically operable vibrator supported by the table and disposed within and exhausting into the manifold to pulsate the fluid feed to said chamber.

13. In a separating apparatus, a riffled permeable table, means for feeding fluid under pressure to the table including a fluid chamber, a pneumatically operable vibrator for the table exhausting into the chamber whereby to amplify and pulsate the fluid feed to the table, unitary resilient means for mounting the table and vibrator, said secondary unit being separable from the table for removal of the concentrates contained therein.

14. In the herein described method of separation of material including the vibration and flotation of the material, the steps of vibrating the material by a pneumatically operable vibrator, effecting flotation of the material by a constant flow of air passed entirely through the depth of the material, and pulsating said air flow by the added exhaust fluid from the vibrator.

15. In a separator device, the combination with a supporting structure, of a frame pivotally mounted on the supporting structure, a permeable table, a pneumatically operable vibrator, a flexible mounting for supporting the table and vibrator carried by the frame, said mounting including a pair of flat rotatable springs and said vibrator having its directional thrust in the direction of flexing of the springs, common means for adjusting the vibrator and the springs in relation to the table to vary the directional flexing of the springs and the directional thrust of the vibrator, a source of fluid pressure and means for conveying the fluid pressure to the table including a chamber adjacent the under side of the table, said vibrator being located in and exhausting into the chamber.

16. In a separator device, a permeable material-receiving table, means for feeding a constant flow of a gaseous fluid under pressure to the table, a pneumatically operable vibrator for vibrating the table, means separately supplying fluid to operate the vibrator, said vibrator exhausting into said constant fluid flow to the table for increasing and pulsating said flow.

THOMAS HUBBARD MORGAN.